United States Patent
Kemp et al.

(10) Patent No.: US 7,284,246 B2
(45) Date of Patent: Oct. 16, 2007

(54) EXTENSIBLE DEVICE DRIVER

(75) Inventors: Devon James Kemp, Laguna Hills, CA (US); Christopher John Carcerano, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 10/131,012

(22) Filed: Apr. 23, 2002

(65) Prior Publication Data

US 2003/0200427 A1    Oct. 23, 2003

(51) Int. Cl.
  G06F 3/00    (2006.01)
  G06F 9/44    (2006.01)
  G06F 9/46    (2006.01)
  G06F 13/00   (2006.01)
  G06F 3/048   (2006.01)
  G06F 9/00    (2006.01)
  G06F 9/24    (2006.01)

(52) U.S. Cl. .................. 719/321; 719/322; 719/327; 719/331; 715/764; 715/777; 713/1

(58) Field of Classification Search ........ 719/321–327, 719/331; 715/777, 866, 764; 713/1
See application file for complete search history.

(56) References Cited

U.S. PATENT DOCUMENTS

| | | | |
|---|---|---|---|
| 5,381,547 A | 1/1995 | Flug et al. | 395/700 |
| 5,535,329 A | 7/1996 | Hastings | 395/183.11 |
| 5,548,759 A | 8/1996 | Lipe | 395/600 |
| 5,604,843 A * | 2/1997 | Shaw et al. | 358/1.1 |
| 5,682,510 A * | 10/1997 | Zimmerman et al. | 715/843 |
| 5,687,301 A | 11/1997 | Stokes et al. | 395/112 |
| 5,844,551 A * | 12/1998 | Nakajima et al. | 715/762 |
| 5,958,049 A * | 9/1999 | Mealey et al. | 713/1 |
| 6,008,806 A * | 12/1999 | Nakajima et al. | 715/744 |
| 6,141,698 A | 10/2000 | Krishnan et al. | 709/331 |
| 6,160,550 A * | 12/2000 | Nakajima et al. | 715/745 |
| 6,208,337 B1 * | 3/2001 | Zimmerman et al. | 715/866 |
| 6,222,638 B1 | 4/2001 | Otala | 358/1.18 |
| 6,304,258 B1 * | 10/2001 | Zimmerman et al. | 715/804 |
| 6,334,213 B1 | 12/2001 | Li | 717/11 |
| 6,417,872 B2 * | 7/2002 | Zimmerman et al. | 715/777 |
| 6,437,810 B1 * | 8/2002 | Nakajima et al. | 715/804 |
| 6,825,941 B1 * | 11/2004 | Nguyen et al. | 358/1.15 |
| 2001/0002129 A1 | 5/2001 | Zimerman | 715/700 |

FOREIGN PATENT DOCUMENTS

| | | |
|---|---|---|
| EP | 866403 | 9/1998 |
| EP | 1100002 | 5/2001 |

* cited by examiner

*Primary Examiner*—William Thomson
*Assistant Examiner*—Qing-Yuan Wu
(74) *Attorney, Agent, or Firm*—Fitzpatrick, Cella, Harper & Scinto

(57) ABSTRACT

A device driver module for supporting the use of an external device by a computing device which executes an operating system, the device driver module including an initialization portion which is called by the operating system, whereupon the initialization portion detects the presence of a driver plug-in module, obtains information from the detected driver plug-in module, and passes the information from the detected driver plug-in module to the operating system, and also including an operation portion which accesses and executes a functional portion of the detected plug-in module, receives from the operating system an event notification corresponding to the external device and, in the case that the detected driver plug-in module accepts the event notification, passes the event notification to the detected driver plug-in module.

17 Claims, 12 Drawing Sheets

FIG. 7

Canon LBP-1000 PCL6 Properties

General | Sharing | Ports | Advanced | Color Management | Security | Device Settings | Profile 222  223  224  225  226  227  228

Canon LBP-1000 PCL6

Location:

Comment:

Model:   Canon LBP-1000 PCL6

Features

Color: Yes
Double-sided: No.
Staple: Unknown
Speed: Unknown
Maximum resolution: 1200 dpi Paper available:

Printing Preferences...    Print Test Page

OK    Cancel    Apply    Help

220

221

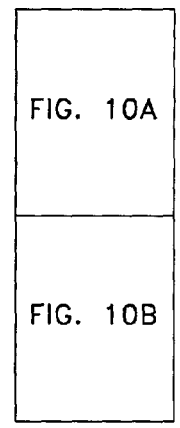
FIG. 10
FIG. 10A
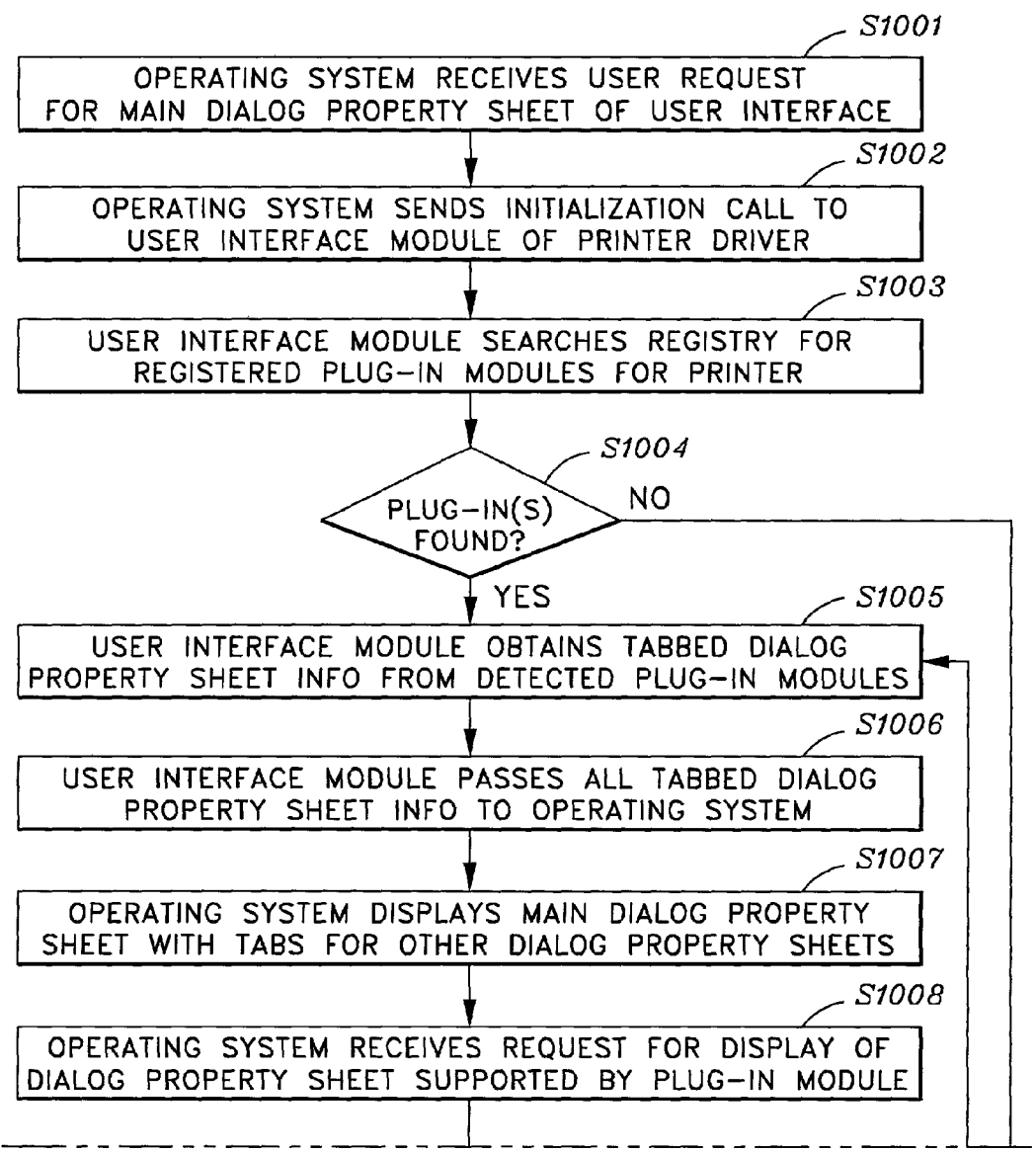

EXTENSIBLE DEVICE DRIVER

BACKGROUND OF THE INVENTION

1. Field of the Invention

The invention concerns a device driver which provides for dynamic extensible functionality without the need for recompilation of the device driver. For example, the present invention can be implemented in a printer driver which interfaces to an operating system, whereby the printer driver detects a driver plug-in module, provides information corresponding to the detected driver plug-in module to the operating system, and then dynamically accesses the functionality of the detected driver plug-in module.

2. Description of the Related Art

Typically, a device driver, such as a printer driver, is installed on a workstation or computer in order to support access to and use of the corresponding device, such as a printer. Device drivers are generally developed and provided by the manufacturer of the corresponding device, and are installed when the corresponding device is physically installed in a computing environment, or before a user begins to use an already-installed device.

A device driver in a windowing operating system is typically comprised of multiple files known as dynamic link library (.dll) files, each of which implements a major functional component of the device driver. For example, a printer driver may be comprised of a user interface .dll file for displaying user interface property sheets, a graphics rendering .dll file for handling the necessary rendering of image data, and other .dll files representing other functional components of the printer driver. In such an example, the user interface .dll file contains compiled code to implement the user interface functionality for the printer driver by utilizing and accessing operating system interface calls. In this manner, the user interface .dll file provides necessary information and parameters to the operating system so that desired user interface property sheets for the printer driver can be displayed on a user's display.

In addition, the user interface .dll file has the necessary functional code to dynamically provide background support for the displayed user interface. For instance, the user interface may include buttons and dialog features for selecting black-and-white printing or color printing, whereupon, when the user selects black-and-white printing, the functional code of the user interface .dll file acknowledges the user's selection on the displayed user interface property sheet and sets an internal flag to pass to the graphics rendering .dll file to implement the user's selection.

As mentioned above, a .dll file of a device driver implements a given functionality of the device driver, such as a user interface .dll file and a graphics rendering .dll file for a printer driver. Each .dll file may itself contain calls to other .dll files. For example, a user interface .dll file may provide a user interface comprised of several tabbed property sheets for the user to choose from depending on the type of device functionality that the user wishes to access and/or modify. In such a case, the user interface .dll file may contain fixed calls to other predetermined .dll files representing each of the tabbed property sheets of the user interface.

Device drivers as described above are typically compiled by the developer of the device driver after which they are statically fixed with respect to the functional capabilities of the device driver. For example, the user interface .dll file is compiled before distribution and subsequent installation on a user's computer, whereupon the user interface property sheets which are displayed and supported by the user interface .dll file will always be the same. Even in the example discussed above in which the user interface .dll file contains fixed calls to other predetermined .dll files, the identity of each of the other predetermined .dll files is always fixed upon compilation of the user interface .dll file.

Accordingly, the functionality of a device driver which is installed on a user's computer is statically fixed and cannot be readily modified to add additional functionality that may be desired by the user, or by a network administrator in a networked computing environment. For example, a network administrator may wish to have a user's printer driver support network-wide printing applications, such as secure printing and job accounting. The printer driver as described above cannot readily be modified by the administrator to add such functionality. Instead, the developer of the printer driver would have to modify the user interface .dll file, as well as other .dll files, to add such functionality, and then recompile and test the .dll files. The modified .dll files of the printer driver would then have to be installed on the user's computer. It can be appreciated that this modification process is cumbersome and inefficient for users, network administrators and device driver developers, every time the addition of new functionality into a device driver is desired.

SUMMARY OF THE INVENTION

The present invention addresses the foregoing problems by providing a printer driver which interfaces to an operating system, whereby the printer driver detects one or more driver plug-in modules, provides information corresponding to each detected driver plug-in module to the operating system, and then dynamically accesses the functionality of each detected driver plug-in module. In this manner, the functionality of the device driver is dynamically extended based on the number and type of driver plug-in modules detected by the device driver, without having to redesign, recompile and retest the device driver.

Accordingly, one aspect of the invention concerns a device driver module for supporting the use of an external device by a computing device which executes an operating system, the device driver module including an initialization portion which is called by the operating system, whereupon the initialization portion detects the presence of a driver plug-in module, obtains information from the detected driver plug-in module, and passes the information from the detected driver plug-in module to the operating system, and also including an operation portion which accesses and executes a functional portion of the detected plug-in module, receives from the operating system an event notification corresponding to the external device and, in the case that the detected driver plug-in module accepts the event notification, passes the event notification to the detected driver plug-in module.

Preferably, the driver plug-in module is detected by searching a system registry of the operating system for an entry corresponding to the driver plug-in module. Also, the information is obtained from the driver plug-in module by utilizing an information function call which is accessed by a pointer that is exported from the driver plug-in module. Also, the device driver module is preferably a user interface module and the information obtained from the driver plug-in module preferably includes attributes of dialog property sheets for display, and a pointer to executable code in the driver plug-in module for implementing a specific function, such as print job accounting or another function. The information obtained from the driver plug-in module is also preferably stored in a local data structure by the user interface module. Lastly, the information obtained from the driver plug-in module preferably includes an event-request indicator for use in determining which types of event notifications are to be passed to the driver plug-in module.

By virtue of the foregoing, the functionality of a device driver can be dynamically extended based on the number and type of driver plug-in modules detected in the computing device by the device driver, such that the functionality of each detected driver plug-in module is accessed and utilized by the device driver without having to redesign, recompile and retest the device driver.

According to anther aspect, the invention concerns a user interface module of a printer driver for supporting the use of a printer by a computing device which executes an operating system. The user interface module includes an initialization portion which is called by the operating system, whereupon the initialization portion detects a driver plug-in identifier in a system registry of the operating system, accesses and loads into a memory a driver plug-in module corresponding to the driver plug-in identifier, obtains a pointer from the driver plug-in module to an information function call within the driver plug-in module, executes the information function call to receive information from the driver plug-in module, stores the received information in a local data structure, and passes a portion of the received information to the operating system by using an operating system function call. The user interface module further includes an operation portion that accesses and executes a functional portion of the driver plug-in module by using a functional pointer provided in the received information, that receives from the operating system event notifications corresponding to a print job being performed by the printer and that, in the case that an event-request indicator provided in the received information indicates that the driver plug-in module accepts the event notification, passes the event notification to the driver plug-in module.

Preferably, the information obtained from the driver plug-in module includes attributes of dialog property sheets for display, and a pointer to executable code in the driver plug-in module for implementing a specific function, such as print job accounting or another function. Also, the event-request indicator preferably defines which types of event notifications are to be passed to the driver plug-in module.

By virtue of the foregoing, the functionality of a device driver can be dynamically extended based on the number and type of driver plug-in modules detected in the computing device by the device driver, such that the functionality of each detected driver plug-in module is accessed and utilized by the device driver without having to redesign, recompile and retest the device driver.

In another aspect of the invention, a driver plug-in module is provided for use by a device driver module of a device driver, the device driver for supporting the use of an external device by a computing device executing an operating system. The driver plug-in module includes a functional portion having executable code that supports a functional application, and a resource portion which includes resource information corresponding to the functionality supported by driver plug-in module, and an information pointer to an information function call. The information pointer is accessed by the device driver module to initiate the information function call which returns to the device driver module a resource pointer corresponding to the resource information of the resource portion, and a functional pointer corresponding to the executable code of the functional portion.

Preferably, the resource information is accessed by utilizing the resource pointer and includes a number of dialog property sheets supported by the driver plug-in module, a type of each dialog property sheet supported by the driver plug-in module, and attributes of each dialog property sheet supported by the driver plug-in module. In addition, the resource portion preferably includes an event pointer to an event handler, and the event pointer is passed to the device driver module via the information function call, whereby the event pointer is used by the device driver module to initiate the event handler to pass the event notification received by the device driver module from the operating system to the driver plug-in module. The device driver module and the driver plug-in module are each preferably comprised of a dynamic link library file.

By virtue of the foregoing, the functionality of a device driver can be dynamically extended based on the number and type of driver plug-in modules registered for detection in the computing device by the device driver, such that the functionality of each detected driver plug-in module is accessed and utilized by the device driver without having to redesign, recompile and retest the device driver.

In a further embodiment, the invention is directed to a method for registering a driver plug-in module for use by a device driver module of a device driver which supports the use of an external device by a computing device. The method includes identifying at least one available driver plug-in module located on an external source, selecting at least one of the available driver plug-in modules for installation on the computing device, and installing each selected driver plug-in module on the computing device by storing each selected driver plug-in module in a memory on the computing device, and entering an identifier corresponding to each selected driver plug-in module into a system registry of an operating system which is executing on the computing device.

Preferably, the method is performed by an installation script obtained from either an installation program provided by the developer of the device driver, or from another source such as the web or a CD-ROM. Also, the identifier corresponding to each selected driver plug-in module is preferably entered into a system registry location which corresponds to the name of the external device.

By virtue of the foregoing, driver plug-in modules can be readily accessed and registered, either at the time of printer installation, or at a later time. Accordingly, the functionality of a device driver can be dynamically extended based on the number and type of driver plug-in modules registered for detection in the computing device by the device driver, such that the functionality of each detected driver plug-in module is accessed and utilized by the device driver without having to redesign, recompile and retest the device driver.

In another embodiment of the invention, a method is presented for performing a print job on a printer, the print job being sent to the printer by a computing device. The method includes receiving, by an operating system executing in the computing device, a first user input request to display a main printer dialog property sheet on a display of the computing device, initiating, by the operating system, execution of a user interface module of a printer driver corresponding to the printer, detecting, by the user interface module, an identifier in a system registry corresponding to a driver plug-in module, obtaining, by the user interface module, tabbed dialog property sheet information and a functional pointer from the driver plug-in module, and passing the tabbed dialog property sheet information and main dialog property sheet information from the user interface module to the operating system. The method further includes displaying, by the operating system, the main printer dialog property sheet on the display, the main dialog property sheet including a tab to access a tabbed dialog property sheet corresponding to the tabbed dialog property sheet information obtained from the driver plug-in module, receiving, by the operating system, a second user input request to display the tabbed dialog property sheet, and displaying, by the operating system, the tabbed dialog property sheet in response to the second user input request. In addition, the method includes receiving, by the operating system, a third user input request to use a function supported by the tabbed dialog property sheet, sending, by the operating system, the third user input request to the user interface module, initiating, upon utilization of the functional pointer by the user interface module, execution of executable code in the driver plug-in module which implements the function corresponding to the third user input request, receiving, by the operating system, a print request to initiate printing of image data by the printer, and rendering, by the printer driver upon receiving the print request from the operating system, the image data into a print job and sending the print job to the printer which executes the print job. Finally, the method includes sending print event notifications related to the print job from the user interface module to the driver plug-in module, the print event notifications being utilized by the executable code in the driver plug-in module.

Preferably, the tabbed dialog information is obtained from the driver plug-in module by utilizing an information function call which is accessed by a pointer that is exported from the driver plug-in module. Also, the tabbed dialog information preferably includes attributes of dialog property sheets for display, and a pointer to executable code in the driver plug-in module for implementing a specific function, such as print job accounting or another function. The information obtained from the driver plug-in module is also preferably stored in a local data structure by the user interface module. Lastly, the information obtained from the driver plug-in module preferably includes an event-request indicator for use in determining which types of event notifications are to be sent to the driver plug-in module.

By virtue of the foregoing, the functionality of a device driver can be dynamically extended based on the number and type of driver plug-in modules detected in the computing device by the device driver, such that the functionality of each detected driver plug-in module is accessed and utilized by the device driver without having to redesign, recompile and retest the device driver.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 7 is a block diagram for explaining a main dialog property sheet of a printer driver user interface according to one embodiment of the present invention.

FIG. 10, comprising FIGS. 10A and 10B, is a flowchart for explaining the interaction between a plug-in module, a printer driver and an operating system according to one embodiment of the present invention.

DETAILED DESCRIPTION OF THE PREFERRED EMBODIMENTS

The present invention is directed to an extensible device driver for use in a computing device to support the use of an external device, such as a printer. In particular, the device driver of the present invention is able to detect and incorporate plug-in modules existing on the computing device in order to extend the functional capabilities of the computing device. As an example, the invention is discussed below according to one embodiment in which the device driver is a printer driver for supporting the use of a printer. It should be appreciated that the present invention can be implemented for other device drivers which support other devices, such as digital copiers, scanners, cameras, and the like.

Figure 1:
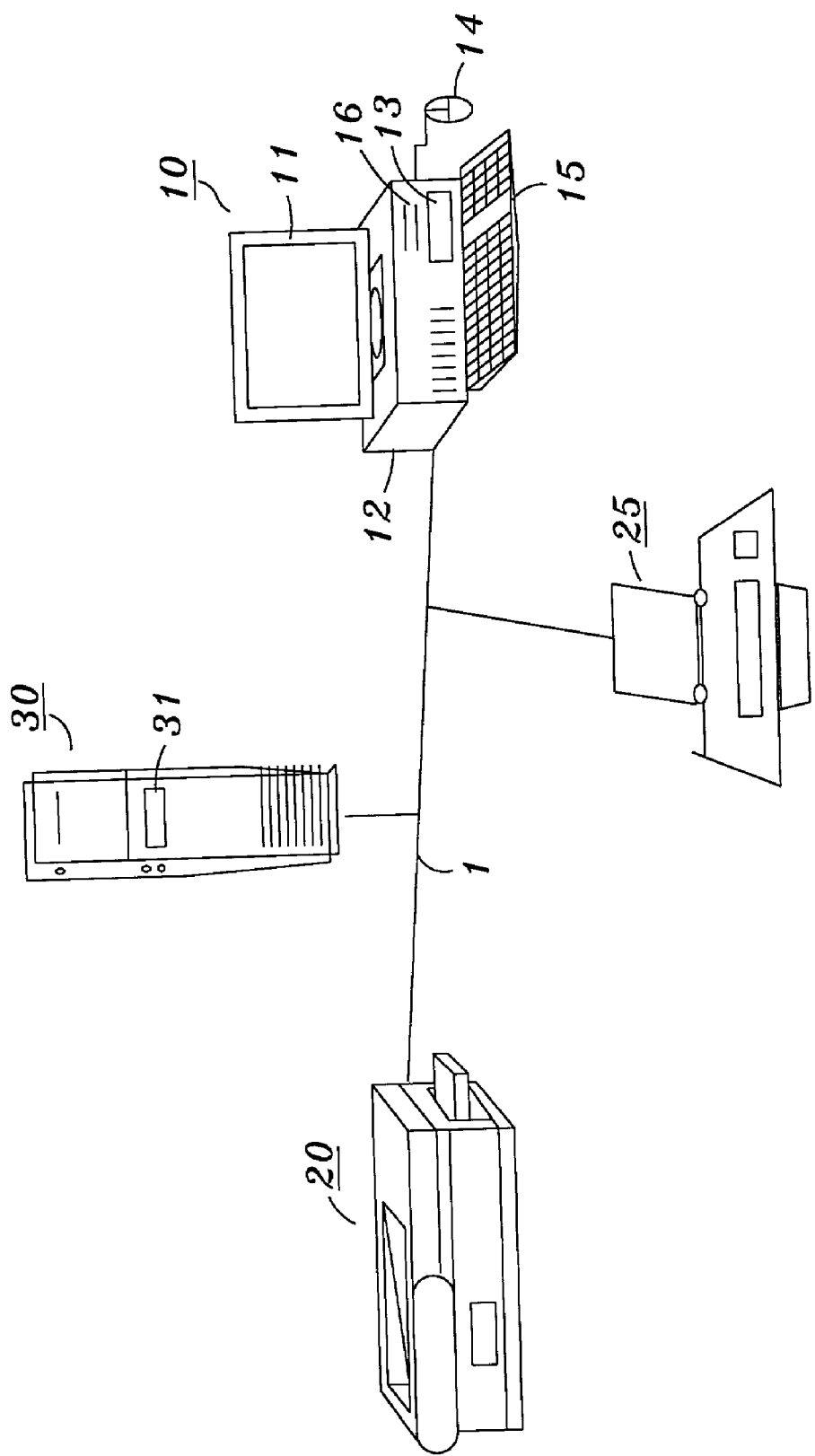
FIG. 1 is a representative view of a computing environment in which the present invention may be implemented according to one embodiment of the invention.

FIG. 1 provides a system view of a computing environment in which the present invention may be implemented. As shown in FIG. 1, the computing environment comprises computer 10, printer 20, server 30, and connection 1. Connection 1 can be a simple local connection between computer 10 and printer 20, such as a serial, USB, FireWire, or other such connection. In the alternative, connection 1 may be a network, such as an Ethernet network medium consisting of a bus-type physical architecture. It should be appreciated that connection 1 may be also be comprised of another type of network, including the internet.

Desktop computer 10 is preferably a typical personal computer or workstation having a windowing operating system environment such as Microsoft Windows 2000, Microsoft Windows ME or Microsoft Windows XP. As is typical with PC-type computers, desktop computer 10 preferably has display 11, keyboard 15, mouse 14, host processor 12, fixed disk 13, CD-ROM drive 16, and a floppy drive and/or other type of storage medium (not shown). The contents of fixed disk 13 of computer 10 according to the present invention are explained in more detail below with respect to FIG. 2.

Printers 20 and 25 are also connected to computer 10 by connection 1 and are preferably laser or ink-jet printers which are capable of printing images on recording medium based on received print data. For example, computer 10 renders a print job by executing a printer driver according to the present invention, as discussed in more detail below. Printer 20 receives the rendered print job from computer 10, and/or from other sources, via connection 1, and then executes the print job. Preferably, printer 20 is in two-way communication with computer 10 via connection 1, so that the status of a print job can be reported back to computer 10 during execution of the print job by printer 20. Printer 25 operates in a manner similar to printer 20 as described above. It should be appreciated that the present invention can be implement in other types of computing devices and is not limited to implementation in computer 10 as shown in FIG. 1. In addition, the present invention can be utilized for supporting types of devices other than printers, such as scanners, copiers, digital cameras, etc.

In addition, connection 1 is preferably a network connection, such as an Ethernet network medium consisting of a bus-type physical architecture. Server 30 is also connected to connection 1. Server 30 preferably comprises a PC-compatible computer having a windowing operating system environment such as Microsoft Windows 2000, Microsoft Windows ME or Microsoft Windows XP. Server 30 has a fixed disk 31 which is preferably a large fixed disk for storing numerous files, applications, data, web pages, and plug-in modules, which are discussed below. Server 30 can therefore be utilized by other devices on connection 1, such as computer 10, as a file server, web page server, applications server, or other type of server. Server 30 may also act as a gateway for other devices on connection 1 to access another network such as the Internet. Finally, server 30 may act as a web server to support web pages for access by computer 10 to obtain and install device plug-in modules, as explained in more detail below.

Figure 2:
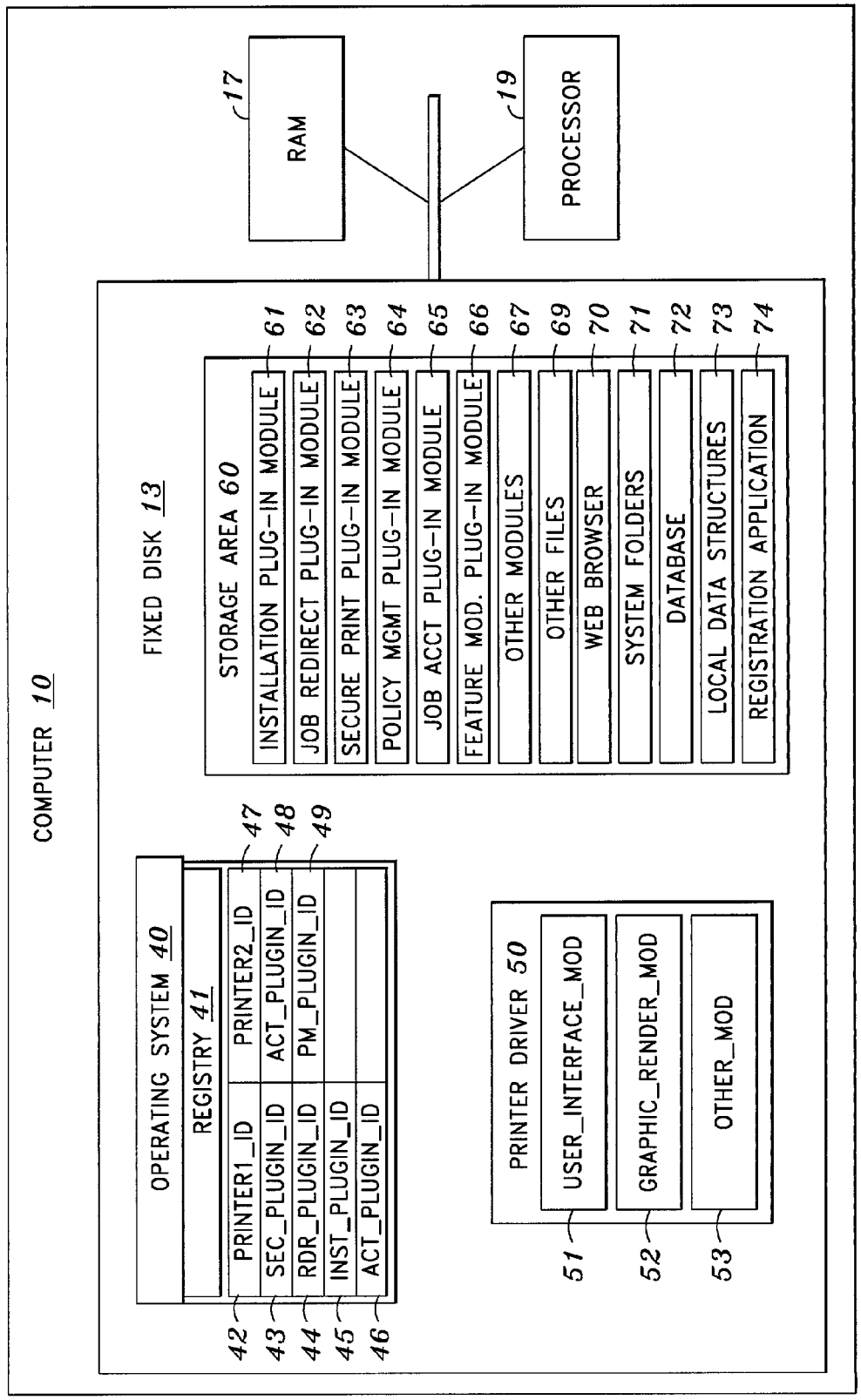
FIG. 2 is a detailed block diagram showing the internal architecture of the computer shown in FIG. 1.

FIG. 2 is a block diagram for explaining the internal architecture of computer 10, including the contents of fixed disk 13, for implementing the present invention. As seen in FIG. 2, the internal architecture of computer 10 includes fixed disk 13, random access memory (RAM) 17 and processor (CPU) 19. As with typical computers, operating system 40 loads executable code for a desired program into RAM 17 for access and execution by CPU 19. Fixed disk 13 of computer 10 includes operating system 40, printer driver 50, and storage area 60. As discussed above, operating system 40 is preferably a windowing operating system, and in particular is preferably a Microsoft Windows operating system which supports function calls to provide an application program interface for applications which are executing on operating system 40. In particular, the function calls preferably include calls for operating system 40 to obtain attributes and information corresponding to property sheets for rendering of such property sheets on display 11 of computer 10. In addition, operating system 40 also includes function calls to support providing status information of external devices to applications which are executing on computer 10.

Registry 41 is an information storage location on fixed disk 13 which can reside in either a file folder or a database of fixed disk 13. Registry 41 is maintained and utilized by operating system 40 and includes information necessary for operating system 40 to support devices, such as printers, scanners, copiers, etc. In this case, for the sake of brevity, registry 41 is shown to only include data corresponding to printers 20 and 25 which are supported by operating system 40 of computer 10. In particular, registry 41 contains plug-in identifiers to implement the present invention and shows two columns corresponding to printers 20 and 25, respectively, that operating system 40 supports. Printer 1_id 42 and printer 2_id 47 are the device identifiers for each of printers 20 and 25, and are generally comprised of a name or a code for the corresponding printer. For example, printer 1_id 42 may be "LASER1" for printer 20, and printer 2_id 47 may be "INKJET1" for printer 25, thereby identifying the two printers which can be utilized by a user of computer 10 through operating system 40.

In the respective columns under printer 1_id 42 and printer 2_id 47 are provided a list of plug-in identifiers which identify each plug-in module that is available in storage area 60 for use by printer driver 50 in order to implement the present invention by adding functionality to a pre-existing device driver, such as printer driver 50, without the need to modify, recompile and test the device driver. Each plug-in identifier is preferably an address of the location in storage area 60 for a corresponding plug-in module. In the alternative, each plug-in identifier can be comprised of a name or a code for the corresponding plug-in module.

Returning to registry 41, the column under printer 1_id 42, which corresponds to printer 20, includes the plug-in identifiers for sec_plugin_id 42, rdr_plugin_id 44, inst_plugin_id 45, and act_plug_id 46, which correspond to secure print plug-in module 63, job redirect plug-in module 62, installation plug-in module 61, and job acct plug-in module 65 located in storage area 60.

In this manner, registry 41 maintains the plug-in identifiers for each printer in order to assist printer driver 50 in detecting which plug-in modules are to be made available for use by printer driver 50 to extend the functionality of printer driver 50. In this regard, each plug-in identifier of registry 41 is entered into registry 41 under a particular device identifier when that device is installed, or at a later time by a user or system administrator of computer 10, as described in more detail below.

Printer driver 50 in FIG. 2 is a driver module for execution by operating system 40 to allow computer 10 to communicate with and utilize printer 20. A similar printer driver (not shown) can be used to communicate with and utilize printer 25, and is not described herein for the sake of brevity.

As seen in FIG. 2, printer driver 50 is comprised of three modules which include user_interface_mod 51, graphics_render_mod 52, and other mod 53. User_interface_mod 51 is utilized to provide a user interface for user access and control of printer driver 50. For example, in this embodiment of the invention, the device driver is printer driver 50 for driving printer 20 by computer 10, and therefore user_interface_mod 51 is executed when the user indicates a desire to view a user interface on display 11 for accessing and controlling the features of printer driver 50. In a windowing operating system such as operating system 40, it is common for a user to hit a button corresponding to a "printer properties" in order to display a dialog property sheet to display a printer driver user interface which is generally comprised of a main dialog property sheet, with tabs for accessing other tabbed dialog property sheets, wherein each dialog property sheet presents buttons, information and dialog regarding certain features of the printer driver.

As discussed above, the present invention provides plug-in modules for access and incorporation by a device driver to extend the functionality of the device driver. In the embodiment described above, the plug-in modules are utilized to add new functions to the printer driver 50, such as job accounting, secure printing and the like. In addition, the plug-in modules also provide tabbed dialog property sheets, corresponding to the new functions, for access by user_interface_mod 51 to incorporate into the printer driver user interface displayed on display 11. The composition and operation of user_interface_mod 51 is discussed in more detail below.

Graphics_render_mod 52 is another component of printer driver 50 and is used to render given image data into a print job according to the desired settings of a user of computer 10. Other_mod 53 represents other modules that are used to implement printer driver 50. In this regard, Graphics_render_mod 52 and other_mod 53 can also extend their functionality by accessing and incorporating plug-in modules, however, for the sake of brevity, the use of plug-in modules is described in detail below with respect to user_interface_mod 51. Preferably, the aforementioned modules of printer driver 50 are dynamic link library files.

Storage area 60 is an area of fixed disk 13 which is used by both operating system 40 and printer driver 50 to operate the computer and to utilize printer driver 50 according to the present invention. As seen in FIG. 2, storage area 60 includes installation plug-in module 61, job redirect plug-in module 62, secure print plug-in module 63, policy mgmt plug-in module 64, job acct plug-in module 65, and feature mod plug-in module 66. As described above with respect to registry 41, these plug-in modules are used for access to extend the functionality of a device driver, such as printer driver 50. For example, installation plug-in module 61 provides functionality for installation of new printers for use by computer 10, job redirect plug-in module 62 provides functionality for redirecting print jobs from one printer to another printer, secure print plug-in module 63 provides functionality for ensuring that print jobs are sent to a printer and printed in a secure fashion, policy mgmt plug-in module 64 provides functionality for managing access to printers and printer functionality, job acct plug-in module 65 provides functionality for tracking and reporting print jobs sent to a printer, and feature mod plug-in module 66 provides functionality for supporting new hardware added to a printer, such as a paper tray or a finishing device such as a stapler. Of course, it should be appreciated that the types of plug-in modules shown in storage area 60 of FIG. 2 are examples of functions for use by a printer driver to support a printer, and are not an exhaustive list of the types of functions that can be implemented by plug-in modules for a printer driver, much less for other devices such as scanners, copiers, digital cameras, etc. Preferably, the plug-in modules are dynamic link library files.

Returning to FIG. 2, it can be seen that storage area 60 also includes other modules 67, other files 69, web browser 70, system folders 71, database 72, local data structures 73 and registration application 74. Other modules 67 and other files 69 are utilized for operation of computer 10 by operating system 40 and by other applications executed by CPU 19 of computer 10. Web browser 70 is executed by CPU 19 in order to allow a user of computer 10 to access web pages of web servers, such as server 30, via connection 1. System folders are managed locations which store files and applications for use by operating system 40 and by other applications executed by CPU 19. Similarly, database 72 is used to store information that may be accessed and used by operating system 40 and by other applications executed by CPU 19. Local data structures 73 is a set of data structures for use by user_interface_mod 51, as described in more detail below. Lastly, registration application is an application, preferably comprised of an instruction script, which is used to identify and install plug-in modules into registry 41, as described in more detail below.

Figure 3:
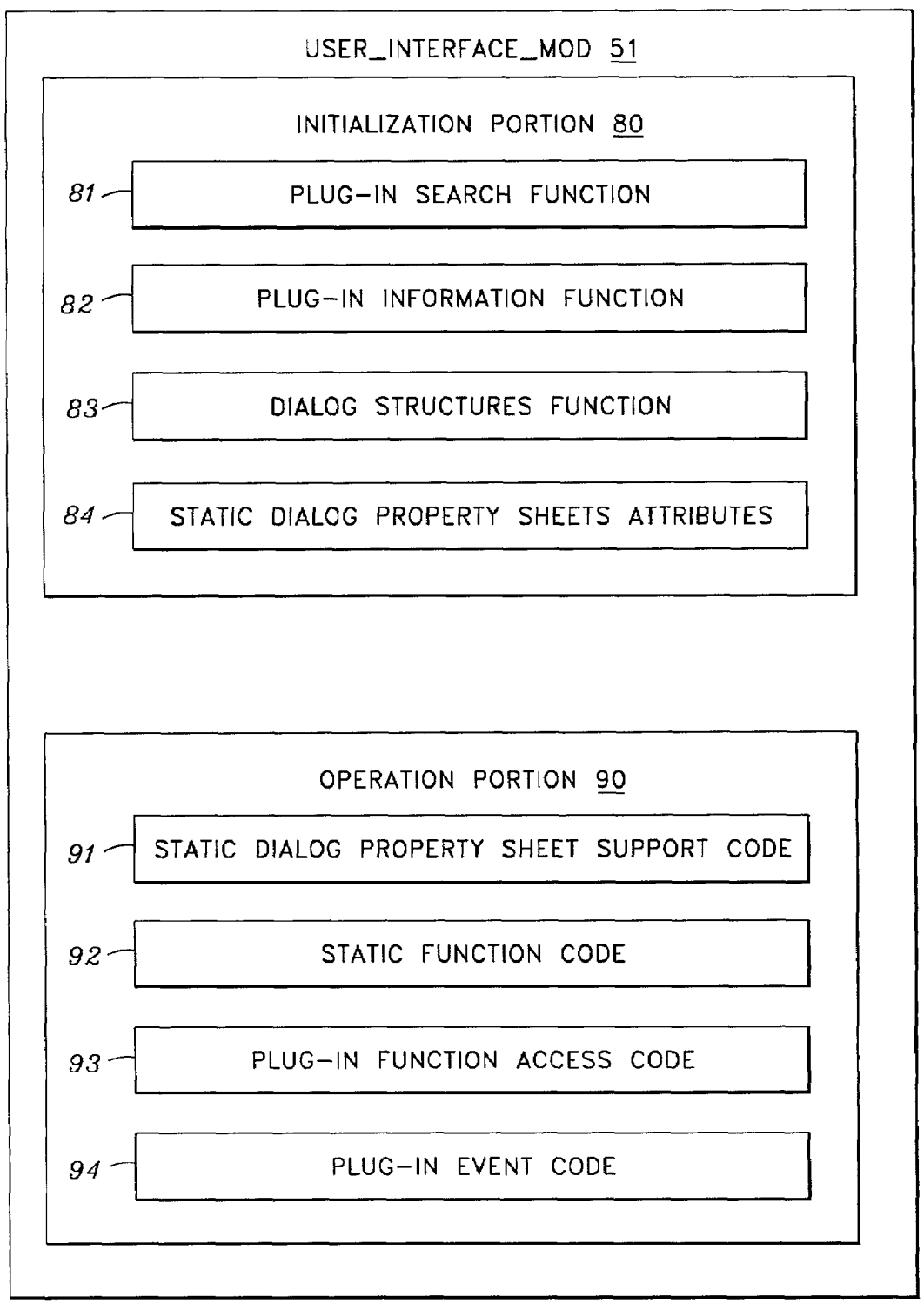
FIG. 3 is a block diagram for explaining the components of a user interface module of a printer driver according to one embodiment of the present invention.

FIG. 3 is a block diagram for describing the composition of user_interface_mod 51 of printer driver 50 shown in FIG. 2. A seen in FIG. 3, user_interface_mod 51 is comprised of initialization portion 80 and operation portion 90. Initialization portion 80 is used to initialize user_interface_mod 51 in response to a user request to view the user interface for printer driver 50. For example, when a user selects "printer properties" button on display 11 which corresponds to printer 20, operating system 40 initiates execution of initialization portion 80 of user_interface_mod 51 in order to initialize the printer driver user interface and to pass necessary dialog property sheet information to operating system 40 for display. Initialization portion 80 includes plug-in search function 81, plug-in information function 82, dialog structures function 83 and static dialog property sheets attributes 84.

Plug-in search function 81 searches a predetermined location, such as registry 41, for registered plug-in modules corresponding to printer 20. Of course, another location such as a system directory folder, or a database, can be used as a predetermined location to store plug-in modules for access by plug-in search function 81. Plug-in information function 82 obtains information corresponding to any plug-in modules detected by plug-in search function 81, and selects those detected plug-in modules that can be utilized by user_interface_mod 51. Plug-in information function 82 stores the obtained information for each selected plug-in module into a local data structure.

Dialog structures function 83 is used to pass to operating system 40 information and attributes of each static dialog property sheet supported by user_interface_mod 51, as well as the obtained information and attributes of each tabbed dialog property sheet supported by the selected plug-in modules. Once operating system 40 receives the information and attributes for each dialog property sheet, operating system 40 displays the rendered dialog property sheets on display 11 of computer 10. In this regard, static dialog property sheets attributes 84 contains the information and attributes of each static dialog property sheet supported by user_interface_mod 51.

Operation portion 90 of user_interface_mod 51 is comprised of static dialog property sheet support code 91, static function code 92, plug-in functional access code 93, and plug-in event code 94. Operation portion 90 is executed after initialization portion 80 has completed, and operation portion 90 is used to support the static dialog property sheets, to access the corresponding plug-in module for support of each tabbed dialog property sheet supported by the selected plug-in modules, and to pass event information to appropriate plug-in modules, if required. Static dialog property sheet support code 91 provides a dialog process to support the static dialog property sheets by monitoring for user modification of settings and buttons on each static dialog property sheet, and then updating the static dialog property sheet in a corresponding manner, and passing the modified settings to static function code 92 and possibly to other portions of printer driver 50, such as Graphics_render_mod 52, to implement the user's modification. For example, a user may utilize a button on one of the main dialog property sheets of a displayed printer driver user interface to select black-and-white printing instead of color printing. Static dialog property sheet support code 91 would pass this user selection to Graphics_render_mod 52 so that the image data is rendered in black-and-white in a print job for printing by printer 20. Static function code 92 is used to handle other static functions of user_interface_mod 51, such as monitoring status of communication with printer 20 and monitoring status of a print job being performed by printer 20.

Plug-in function access code 93 is used to access the functional code of each selected plug-in, for supporting the tabbed dialog property sheets provided by the corresponding selected plug-in module, and for implementing the function supported by each selected plug-in module, such as job accounting, policy management, and the like. Plug-in event code 94 receives an event notification from operating system 40 corresponding to printer 20, determines whether the received event notification has been requested by any of the selected plug-in modules, and then passes the event notification to the appropriate selected plug-in modules for their use.

Figure 4:
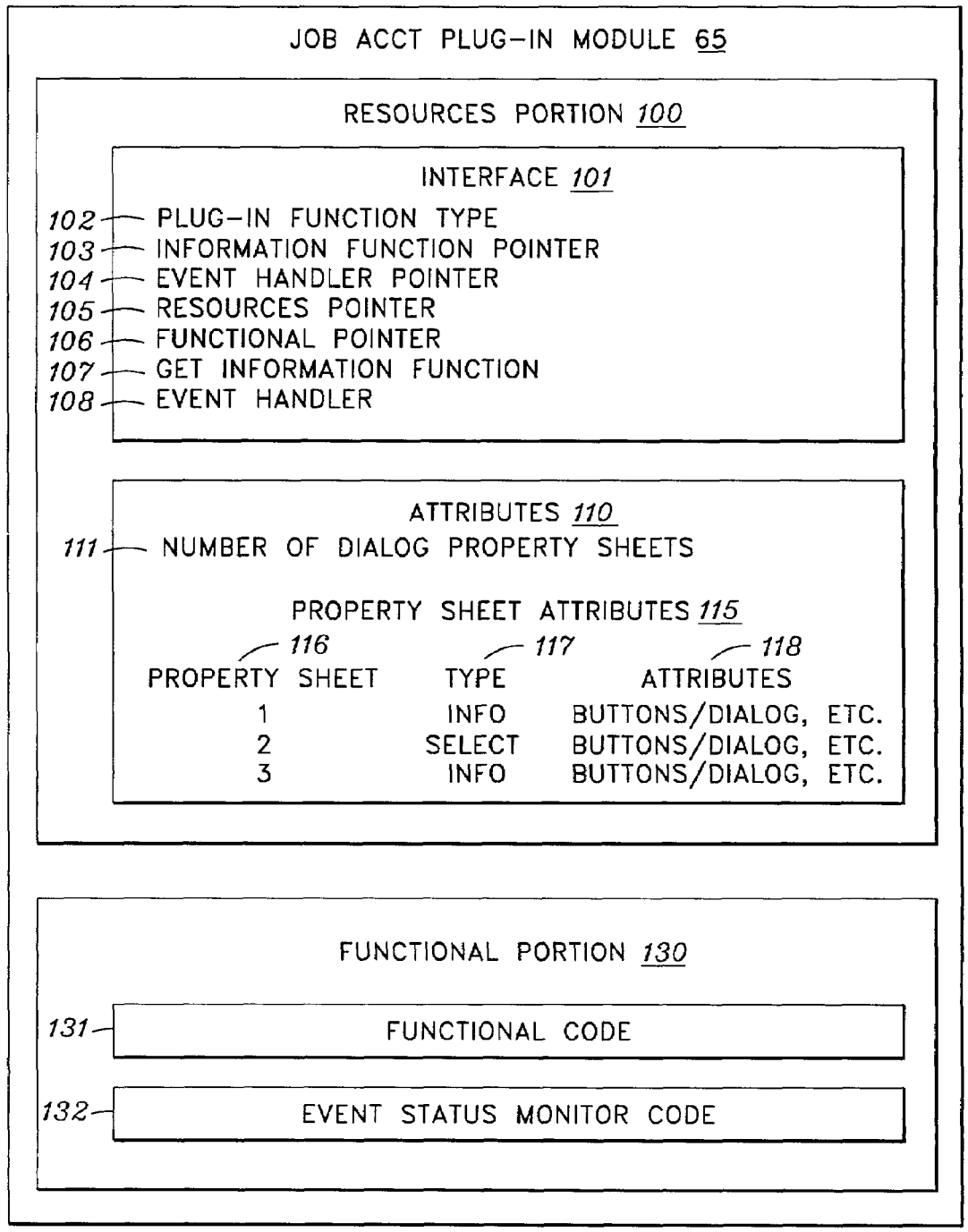
FIG. 4 is a block diagram for explaining the components of a plug-in module according to one embodiment of the present invention.

FIG. 4 is a block diagram for describing the composition of a plug-in module according to one embodiment of the present invention. For purposes of generally describing the composition of such plug-in modules, job acct plug-in module 65 is illustrated in FIG. 4. As seen in FIG. 4, job acct plug-in module 65 includes resources portion 100 and functional portion 130. In general, resources portion 100 provides the information and functions to allow user_interface_mod 51 to access and implement the tabbed dialog property sheets and functionality supported by job acct plug-in module 65. Functional portion 130 generally provides the functional code to support the tabbed dialog property sheets described in resources portion 100 and to provide the functionality of job acct plug-in module 65 which tracks and reports the number and type of print jobs sent to a given printer.

As seen in FIG. 4, resources portion includes interface 101 and attributes 110. Interface 101 provides the information and functions for allowing user_interface_mod 51 to access and implement the tabbed dialog property sheet information and the functionality supported by job acct plug-in module 65. Interface 101 includes plug-in function type 102, information function pointer 103, event handler pointer 104, resources pointer 105, functional pointer 106, get information function 107, and event handler 108. Plug-in function type 102 provides an indication, preferably in text or code, of the type of function supported by the plug-in module, which in this case is job accounting. Information function pointer 103 is a pointer representing an address of get information function 107, whereby job acct plug-in module 65 provides user_interface_mod 51 with information function pointer 103, and then user_interface_mod 51 calls get information function 107 using information function pointer 103 to access information contained in job acct plug-in module 65.

Event handler pointer 104 is a pointer to an address of event handler 108, and is provided to user_interface_mod 51 by job acct plug-in module 65 so that user_interface_mod 51 can call event handler 108 to provide an event notification regarding printer 20 to job acct plug-in module 65. In this regard, user_interface_mod 51 determines if the event notification should be sent to job acct plug-in module 65 based on event handler 108 which is passed to user_interface_mod 51 via get information function 107. In another embodiment, event handler 108 can also provide a descriptor, in text or code, of the type of event notification that should be sent to job acct plug-in module 65. For example, the job accounting function of job acct plug-in module 65 needs the number of successfully printed pages of a print job and the type of the print job to keep an accurate account of all print jobs sent to printer 20. Resources pointer 105 is a pointer to an address of attributes 110, and is provided to user_interface_mod 51 via get information function 107 thereby allowing user_interface_mod 51 to access the type and the attributes of each tabbed dialog property sheet supported by job acct plug-in module 65.

Similarly, functional pointer 106 is a pointer to an address of attributes 110, and is provided to user_interface_mod 51 via get information function 107 thereby allowing user_interface_mod 51 to access the type and the attributes of each tabbed dialog property sheet supported by job acct plug-in module 65.

Attributes 110 is accessed by resources pointer 105 and contains number of dialog property sheets 111 and property sheet attributes 115. Number of dialog property sheets 111 indicates the number of dialog property sheets supported by job acct plug-in module 65. Property sheet attributes 115 is a data structure containing columns for each dialog property sheet supported by job acct plug-in module 65 which represent property sheet number 116, type 117 and attributes 118. In this manner, once resources pointer 105 is obtained by user_interface_mod 51, the type and the attributes of each dialog property sheet supported by job acct plug-in module 65 can be obtained by user_interface_mod 51 and then passed to operating system 40 for rendering the tabbed property sheets on display 11. Type 117 is preferably text or code representation of the type of dialog property sheet, such as INFO for a static property sheet, and SELECT for a dynamic property sheet which allows the user to modify parameters using buttons and the like. Attributes 118 contains descriptive data for the dialog property sheet layout, the buttons, and dialog on the dialog property sheet, and other aspects of the dialog property sheet that are needed by operating system 40 to render the dialog property sheet on display 11.

Functional portion 130 includes functional code 131 and event status monitor code 132. Functional code 131 is executable code that is called by user_interface_mod 51 by using functional pointer 106, which is obtained by user_interface_mod 51 via get information function 107. Functional code 131 implements the functionality of job acct plug-in module 65, which in this case is print job accounting. Event status monitor code 132 handles receipt of an event notification which is passed to job acct plug-in module 65 from user_interface_mod 51 via event handler 108. Event status monitor code 132 passes the received event notification to functional code 131 for use in implementation of the functionality supported by job acct plug-in module 65.

Figure 5:
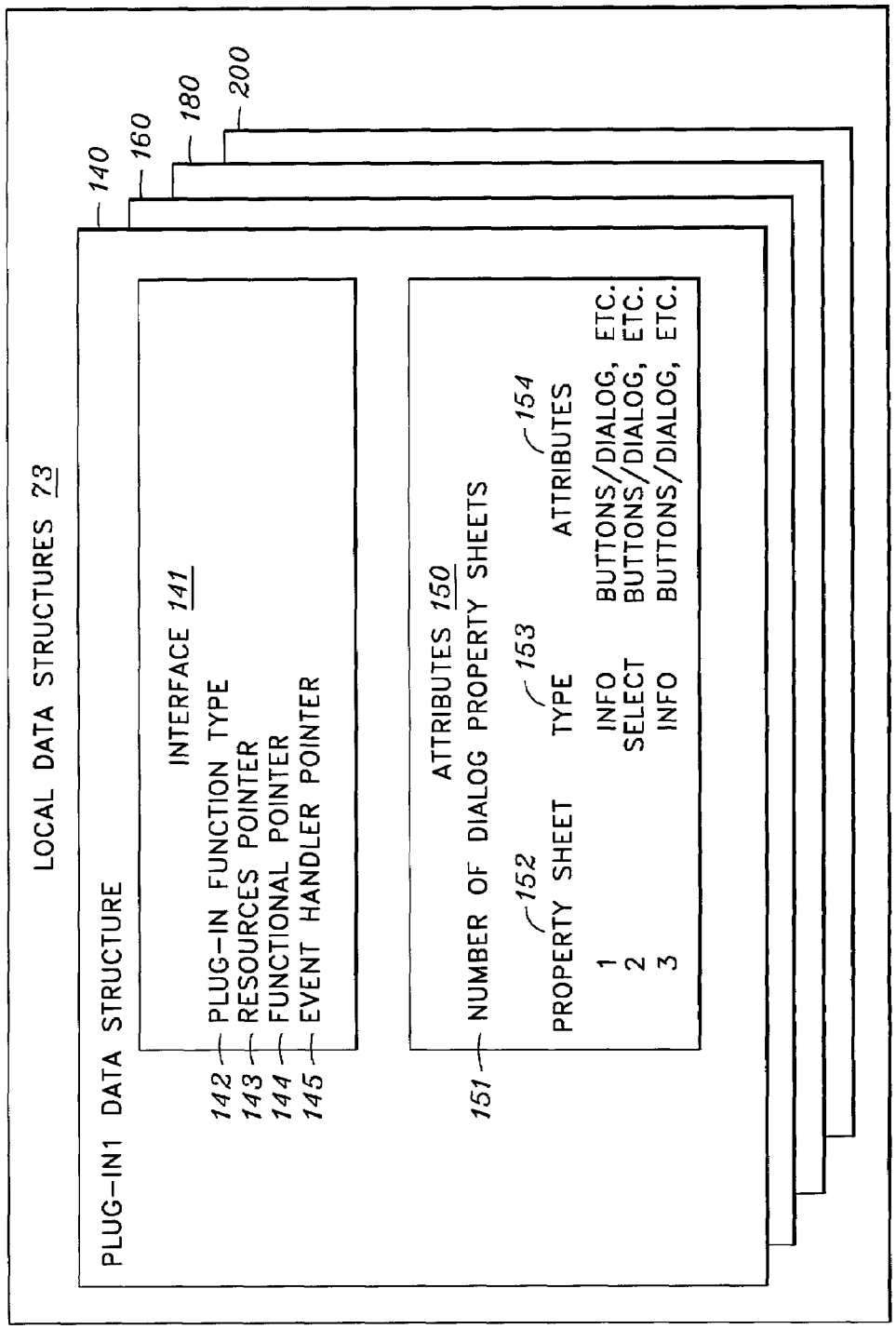
FIG. 5 is a block diagram for explaining the components of a local data structure according to one embodiment of the present invention.

FIG. 5 is a block diagram for describing the composition of a local data structures 73 of storage area 60 in FIG. 2. As discussed above with respect to initialization portion 80 of user_interface_mod 51 in FIG. 3, user_interface_mod 51 used the get information function 107 to obtain information, pointers and attributes from job acct plug-in module 65. Once initialization portion 80 has received this information from job acct plug-in module 65, it places the information in a separate data structure corresponding to job acct plug-in module 65 so that is can later be accessed quickly and efficiently without having to use get information function 107 again. In particular, plug-in information function 83 and dialog structures function 84 of initialization portion 80 of user_interface_mod 51 obtain the information from each selected plug-in module and place it in a separate directory structure of local data structures 73.

Returning to FIG. 5, local data structures 73 is seen to include structures 140, 160, 180 and 200 corresponding to each of the four plug-in modules registered for printer1_id 42 in registry 41, which corresponds to printer 20. For sake of brevity, only data structure 140 will be discussed because it corresponds to information obtained by user_interface- _mod 51 from job acct plug-in module 65. As seen in data structure 140, the information contained therein is a subset of the information contained in resources portions 100 of job acct plug-in module 65. In particular, the information includes plug-in function type 142, resources pointer 143, functional pointer 144, event handler pointer 145, and attributes 150. Attributes 150 contains number of dialog property sheets 151, and property sheet number 152, type 153, and attributes 154 of each dialog property sheet supported by job acct plug-in module 65. Each of these data were described above with respect to job acct plug-in module 65 of FIG. 4, and will not be described further herein.

Figure 6:
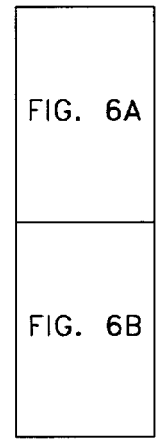
FIG. 6, comprising
Figure 6A:
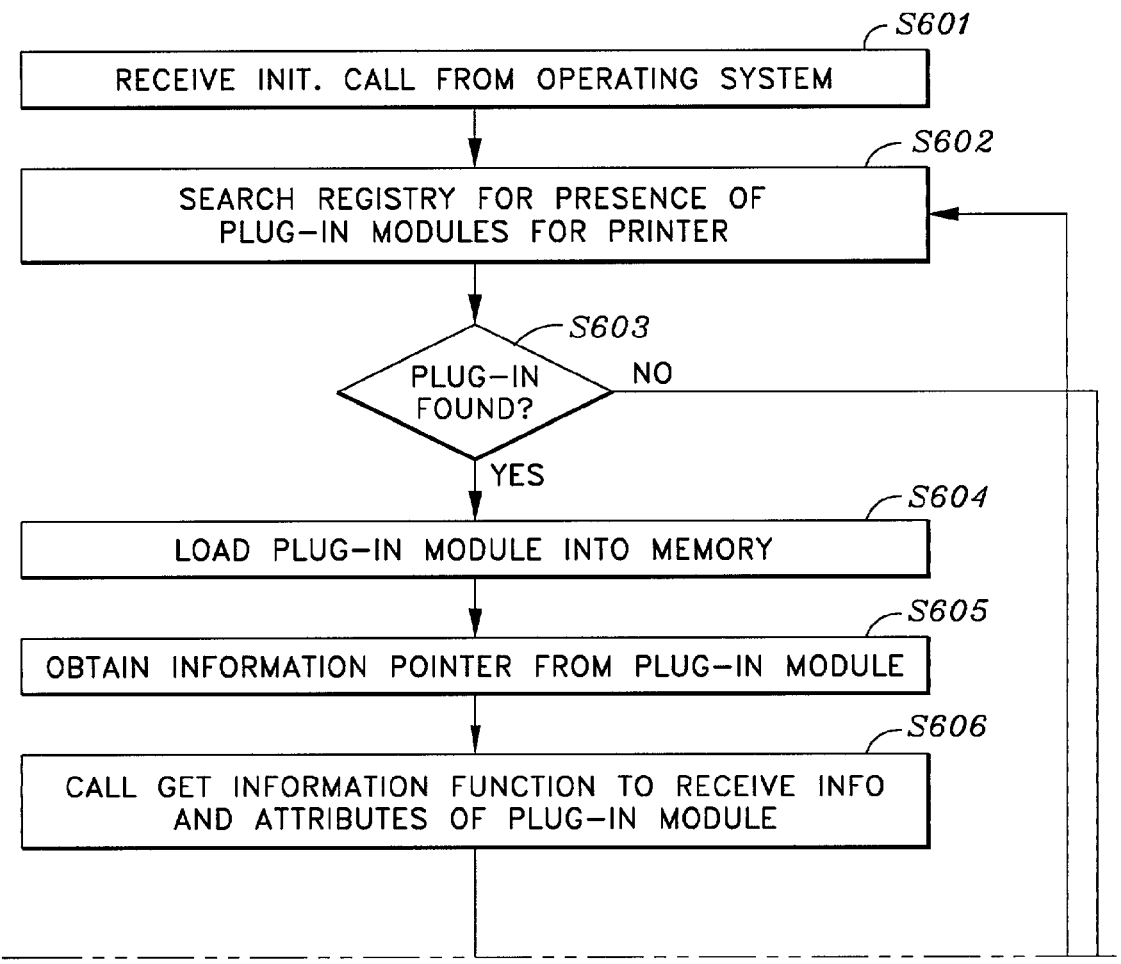
FIGS. 6A and 6B, is a flowchart for explaining the use of a plug-in module by a printer driver according to one embodiment of the present invention.
Figure 6B:
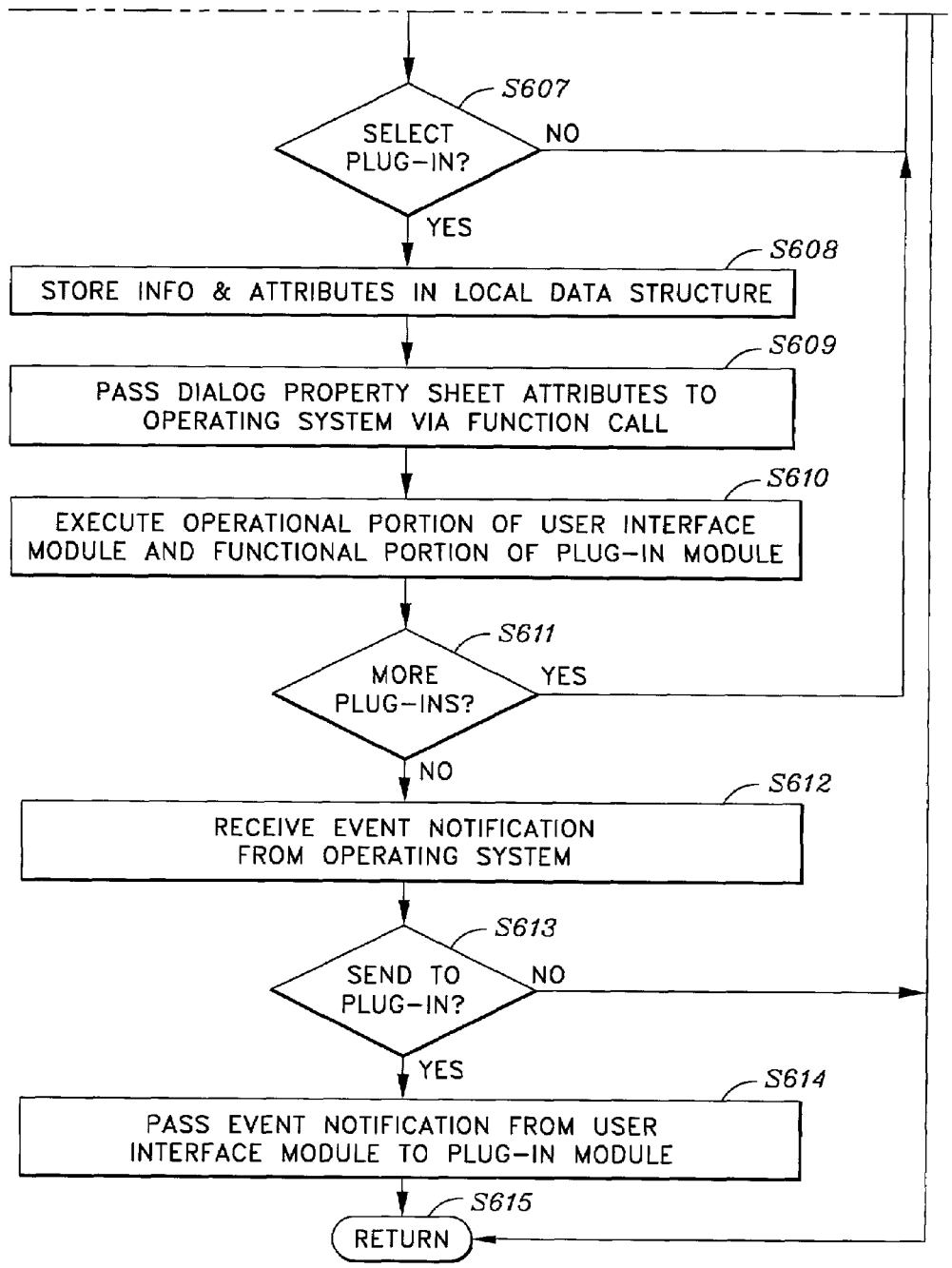

FIG. 6 is a flowchart which describes the interaction between user_interface_mod 51 and job acct plug-in module 65. In step S601, user_interface_mod 51 receives an initialization call from operating system 40 and then triggers initialization portion 80. In step S602, plug-in search function 81 searches the registry for the presence of plug-in modules corresponding to printer 20. In step S603, it is determined if a plug-in module has been detected. If not, flow proceeds to return in step S615. If a plug-in module has been detected, flow passes to step S604 in which the detected plug-in module, such as job acct plug-in module 65, is loaded into memory, such as RAM 17. Next, in step S605, plug-in information function 82 obtains information function pointer 103 from job acct plug-in module 65. Plug-in information function 82 then uses the information function pointer 103 in step S606 to call get information function 107 in order to receive information and dialog property sheet attributes 110 from resources portion 100 of job acct plug-in module 65.

It is determined in step S607 if the detected plug-in module, in this case job acct plug-in module 65, is a type supported by user_interface_mod 51. If not, flow passes to step S602 to continue searching for registered plug-in modules. If the plug-in module is supported, which in this case job accounting is supported, then flow passes to step S608 in which the received information from job acct plug-in module 65 is stored in a separate local data structure 140 of local data structures 73. In step S609, dialog structures function 83 passes attributes of all dialog property sheets, both static and from plug-ins, to operating system 40 for rendering by operating system 40 as a printer driver user interface on display 11. In step S610, operational portion 90 of user_interface_mod 51 is executed and functional portion 130 of job acct plug-in module 65 is called and executed by operational portion 90 as needed to implement the function supported by job acct plug-in module 65.

Next, in step S611, it is determined if there are more plug-ins to be incorporated by user_interface_mod 51, and if there are, flow passes to step S602. If there are not more plug-ins, flow passes to step S612 in which user_interface_mod 51 receives an event notification regarding printer 20 from operating system 40. It is determined in step S613 if the type of received event notification is requested by job acct plug-in module 65 using event handler 108. If so, then flow passes to step S614 in which the event notification is passed from user_interface_mod 51 to job acct plug-in module 65 for use by the executable code in job acct plug-in module 65, and then flow passes to return in step S615. If not, flow passes directly to return in step S615.

FIG. 7 is a graphic depiction of printer driver user interface 220 in a case in which no plug-in modules have been detected and incorporated by user_interface_mod 51. As seen in FIG. 7, printer driver user interface 220 is comprised of eight tabbed dialog property sheets, 221 through 228, which represent static dialog property sheets inherently supported by user_interface_mod 51. The eight tabbed dialog property sheets, 221 through 228, represent various aspects of printing in printer 20.

Figure 8:
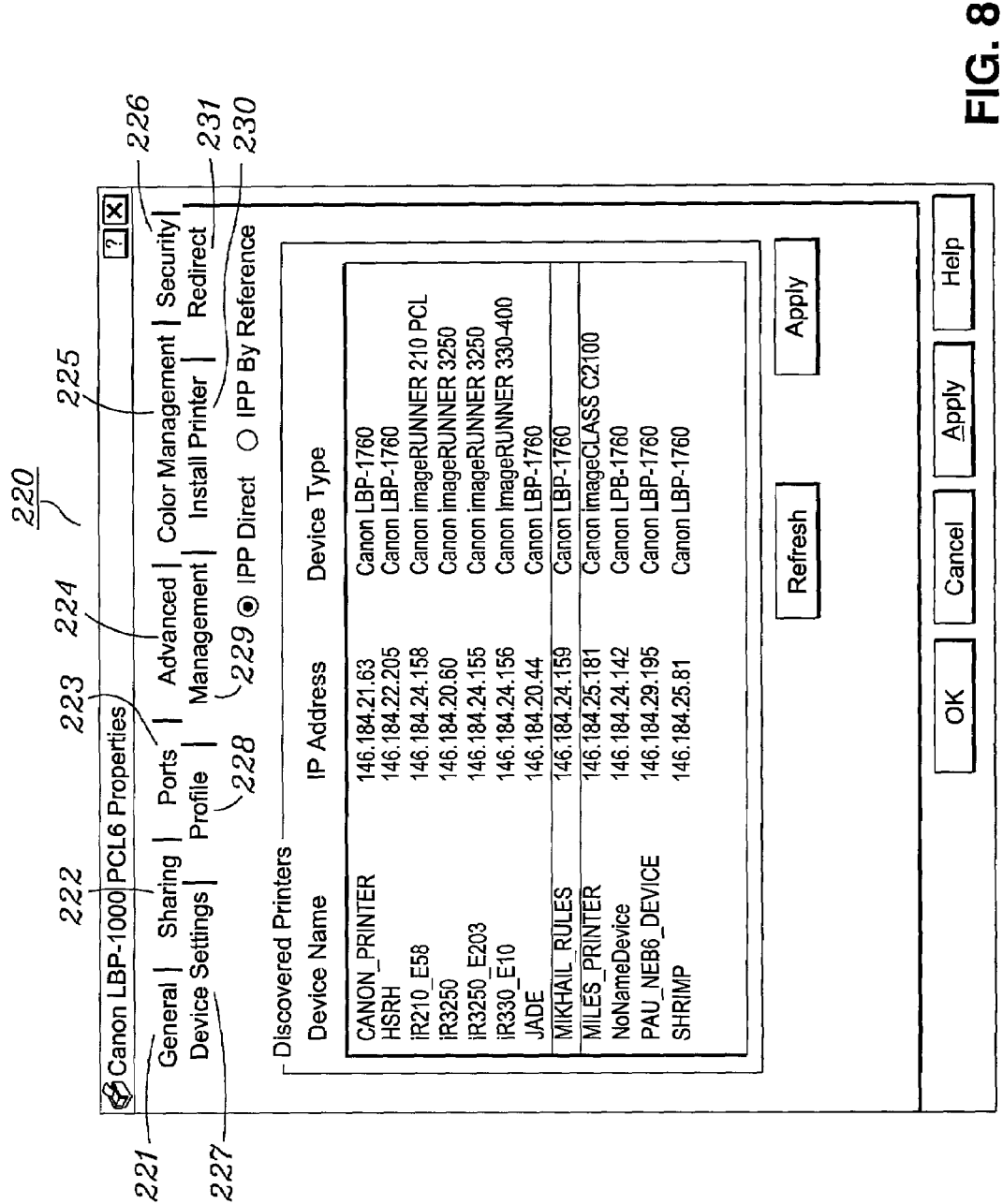
FIG. 8 is a block diagram for explaining a main dialog property sheet of a printer driver user interface which incorporates tabbed dialog property sheets from plug-in modules according to one embodiment of the present invention.

FIG. 8 is a graphic depiction of printer driver user interface 220 in a case in which three plug-in modules have been detected and incorporated by user_interface_mod 51. As seen in FIG. 8, printer driver user interface 220 includes the eight tabbed dialog property sheets, 221 through 228, of FIG. 7, which represent static dialog property sheets inherently supported by user_interface_mod 51. In addition, printer driver user interface 220 includes three additional tabbed dialog property sheets for management 229, install printer 230 and redirect 231, corresponding to policy mgmt plug-in module 64, installation plug-in module 61, and job redirect plug-in module 62. In this manner, the tabbed dialog property sheets for each of these three additional functions are provided by their respective plug-ins via user_interface_mod 51, without the need to modify, recompile and test user_interface_mod 51.

Figure 9:
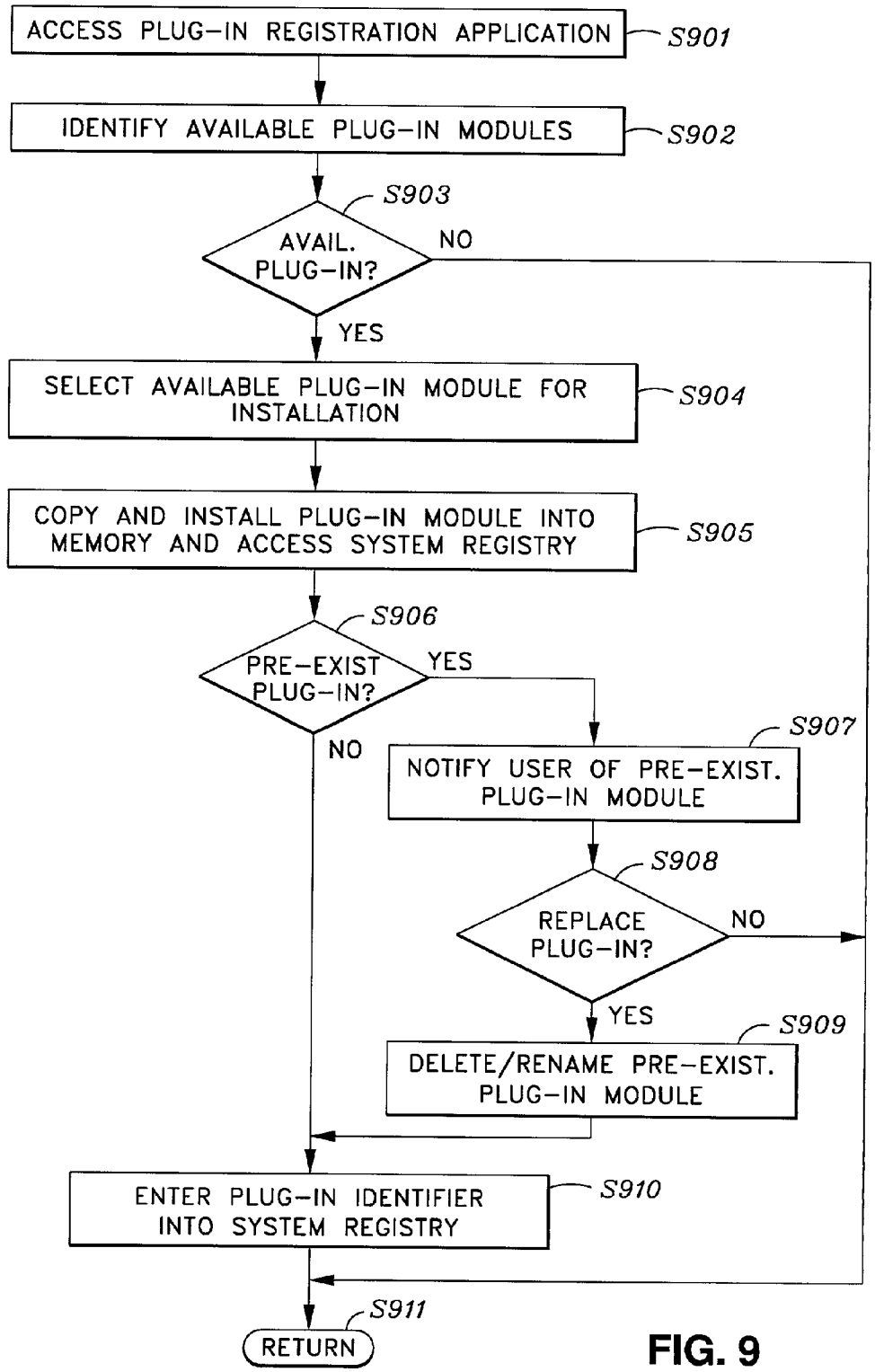
FIG. 9 is a flowchart for explaining the registration of a plug-in module according to one embodiment of the present invention.

FIG. 9 is a flowchart for explaining the identification and registration of device plug-in modules according to the present invention. In step S901, plug-in module registration application 74 is accessed by a user of computer 10. In this regard, the user may be a system administrator responsible for the configuration and maintenance of computer 10, or may simply be a user of computer 10. As discussed above, the plug-in module registration application 74 may be accessed and loaded onto storage area 60 of fixed disk 13 at the time that the corresponding device, such as printer 20, is installed, or at a later time when it is desired to add new functionality to printer driver 50 for printer 20. For example, plug-in module registration application 74 may be accessed from an installation file which is provided with printer 20 by the manufacturer, such as on a CD-ROM, or from a web page via the web on connection 1, from fixed disk 13, or from another memory medium. In this case, plug-in module registration application 74 also preferably installs the components of printer driver 50. Also, plug-in module registration application 74 may be a separate application which is not associated with initial installation of printer 20, and can be accessed and downloaded from the web, a CD-ROM, fixed disk 13 or other memory medium.

Preferably, plug-in module registration application 74 is comprised of an installation script, although programmed code can also be used. Returning to FIG. 9, the available plug-in modules provided by plug-in module registration application 74 are identified for display on display 11 in step S902. The available plug-in modules can be located at the same location that plug-in module registration application 74 was accessed from, or from another location such as from a web page on the web, from a CD-ROM, from fixed disk 13, or from another memory medium. Preferably, the available plug-in modules are arranged and can be sorted based on printer name, printer type or some other parameter. In step S903, it is determined whether any available plug-in modules have been identified. If not, flow passes to return in step S911. If available plug-in modules have been identified and displayed, then at least one available plug-in module is selected for installation in step S904. In this regard, the selection of available plug-in modules may be a manual selection by a user of computer 10, or may be automatic based on a detected type of printer driver 50 in computer 10. The latter case may especially be useful when plug-in modules are installed at the time printer 20 is installed.

In step S905, the selected plug-in module is copied from its source and stored in storage area 60 of fixed disk 13, and registry 41 is accessed to prepare for registration of the selected plug-in module. In step S906, it is determined whether a pre-existing plug-in module has already been registered in registry 41 which is of the same type, or same name, as the selected plug-in module. If so, flow passes to step S907 in which the user of computer 10 is notified of the situation, and it is then determined in step S908 whether the user has instructed to proceed with installation of the selected plug-in module by replacing, or renaming, the pre-existing plug-in module. If the user opts for replacement (or renaming), flow passes to step S909 in which the pre-existing plug-in module is deleted or renamed, as the case may be. Flow then passes to step S910. If, on the other hand, it is determined in step S908 that the user has not instructed to proceed with installation of the selected plug-in module by replacing, or renaming, the pre-existing plug-in module, then flow passes to return in step S911.

If it is determined in step S906 that a pre-existing plug-in module has not already been registered in registry 41 which is of the same type, or same name, as the selected plug-in module, then flow passes directly to step S910. An identifier is then entered into registry 41 for the selected plug-in module in correspondence with an entry for the device supported by the selected plug-in module, in this case printer 20 (step S910). The identifier may be entered under an entry based on a device identifier, such as in registry 41 depicted in FIG. 2, or may be entered under an entry based on device type, user name or computer name, so long as user_interface_mod 51 searches for registered plug-in modules based on these entry types. Flow passes to return in step S911. In this manner, plug-in modules can be readily accessed, installed and registered either at installation of the corresponding device or at some time after its installation, thereby providing new functionality for the device driver for the device without the need to modify, recompile and test the device driver.

Figure 10B:
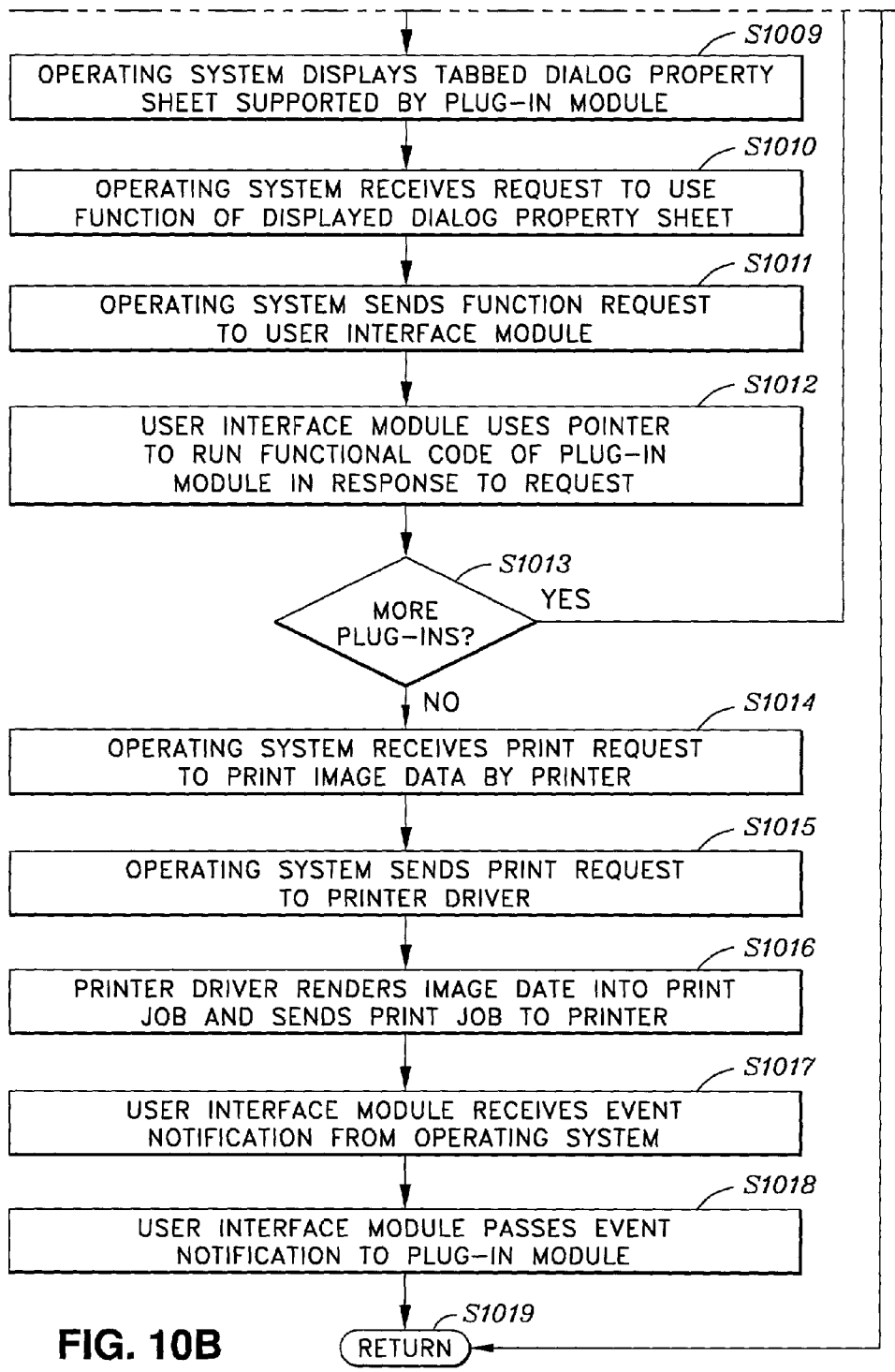

FIG. 10 is a flowchart for explaining the interaction of operating system 40 with user_interface_mod 51 of printer driver 50 and with multiple plug-in modules according to one embodiment of the present invention. In step S1001, operating system 40 receives a user request for display of the main dialog property sheet of the user interface for printer driver 50. The operating system 40 sends an initialization call to user_interface_mod 51 in response to the user request for display of the main dialog property sheet in step S1002. User_interface_mod 51 then searches registry 41 for detection of registered plug-in modules corresponding to printer 20. In step S1004, it is determined if any registered plug-in modules were detected in step S1005. If none were detected, flow passes to return in step S1019. If plug-in modules were detected, flow passes to step S1005 in which user_interface_mod 51 obtains information and attributes corresponding to tabbed dialog property sheets from each detected plug-in module by using information pointers, as discussed above.

Next, in step S1006, user_interface_mod 51 then passes the obtained information and attributes to operating system 40, along with information and attributes for static tabbed dialog property sheets inherently supported by user_interface_mod 51. In step S1007, operating system 40 renders the main dialog property sheet of the printer driver user interface on display 11 of computer 10, wherein the main dialog property sheet has tabs for accessing the other tabbed dialog property sheets obtained from the detected plug-in modules. Operating system 40 receives a request for display of one of the other tabbed dialog property sheets obtained from the detected plug-in modules in step S1008. In step S1009, operating system 40 displays the requested tabbed dialog property sheet obtained from one of the detected plug-in modules. A request is received by operating system 40 in step S1010 to utilize a function supported by the displayed tabbed dialog property sheet, and operating system 40 sends the function request to user_interface_mod 51 in step S1011.

In step S1012, user_interface_mod 51 uses a functional pointer to access and execute the functional code in the plug-in module corresponding to the tabbed dialog property sheet which received the functional request. In this manner, the plug-in module implements a function not inherently supported by user_interface_mod 51 of printer driver 50. In step S1013, it is determined if there are more plug-in modules to incorporate into user_interface_mod 51, and if so, flow passes to step S1005 to obtain the information for the other plug-ins. If not, flow passes directly to step S1014 in which operating system 40 receives a print request from the user to print image data by printer 20. Operating system 40 sends the print request to printer driver 50 in step S1015, and the image data is rendered into a print job which is sent to printer 20 for printing in step S1016. User_interface_mod 51 receives an event notification from operating system 40 regarding the status of printer 20 in step S1017, and user_interface_mod 51 then sends the event notification to the appropriate plug-in modules in step S1018 for their use. Flow then passes to return in step S1019.

In this manner, the operating system, device driver, and driver plug-in modules function together in a coordinated fashion to provide additional functionality to the device driver without the need to modify, recompile and test the device driver.

It should be appreciated that the present invention can be implemented for extending the functional capabilities of device drivers other than printer drivers for supporting other types of devices. In addition, the present invention can be implemented in other types of computing devices and computing environments, with other forms of operating systems, beyond those illustrated herein. In addition, the functional aspects of the software modules, functions, programs, applications, and other files, can be implemented in forms of software and instructions other than those illustrated herein.

The invention has been described with particular illustrative embodiments. It is to be understood that the invention is not limited to the above-described embodiments and that various changes and modifications may be made by those of ordinary skill in the art without departing from the spirit and scope of the invention. In particular, and as stated above, the invention can be used to manage various types of network devices, not just network printers.

What is claimed is:

1. A computer-executable program module stored on a computer-readable medium, said program module for extending device driver functionality of a device driver which drives an external device by a computing device which executes an operating system and the device driver, wherein plural driver plug-ins are storable on the computing device, each containing respective ones of plural extended functionalities for the device driver, the program module comprising:

an initialization portion which is called by the operating system, whereupon the initialization portion detects the presence of the plural driver plug-ins, obtains information from each of the detected plural driver plug-ins, determines plug-ins which are supported by the device driver in accordance with the obtained information from each of the plural driver plug-ins, and passes the information from the determined driver plug-ins to the operating system; and an operation portion which accesses and executes the extended device driver functionality of the determined plug-ins, receives from the operating system an event notification corresponding to the external device, and passes the event notification to one or more of the determined driver plug-ins in the case that the driver plug-in accepts the event notifications, wherein the initialization portion obtains the information from a determined driver plug-in by receiving a pointer to an information function call within the driver plug-in, and then by executing the information function call which returns the information to the initialization portion.

2. A program module according to claim 1, wherein the driver plug-ins correspond to respective dialog property sheets for display by the computing device.

3. A program module according to claim 1, wherein the initialization portion detects the presence of a driver plug-in by detecting an identifier for the driver plug-in in a system registry of the operating system.

4. A program module according to claim 1, wherein the initialization portion detects the presence of a driver plug-in by detecting an identifier for the driver plug-in in a database file located in a memory medium which is accessible to the computing device.

5. A program module according to claim 1, wherein the information received by the initialization portion from the determined driver plug-in includes a resource pointer which represents an address of a resource portion of the determined driver plug-in and a functional pointer which represents an address of a functional portion of the determined driver plug-in.

6. A program module according to claim 5, wherein the functional portion of the determined driver plug-in is comprised of executable code to implement functionality represented by the determined driver plug-in.

7. A program module according to claim 5, wherein the functional of the determined driver plug-in utilizes the event notification passed from the initialization portion.

8. A program module according to claim 1, wherein the information passed to the operating system by the initialization portion is a subset of the information received from the determined driver plug-in.

9. A program module according to claim 8, wherein the information passed to the operating system by the initialization portion includes information corresponding to a number of dialog property sheets supported by the determined driver plug-in and attributes of each dialog property sheet supported by the determined driver plug-in.

10. A program module according to claim 1, wherein the information received from the determined driver plug-in includes a type of functionality supported by the determined driver plug-in, and wherein the initialization portion determines, based on the type of functionality, whether to pass information to the operating system and to access and execute a functional portion of the determined driver plug-in.

11. A program module according to claim 1, wherein the external device is a printer.

12. A program module according to claim 11, wherein the device driver is a user interface module, and wherein each determined driver plug-in implements functionality for one or more dialog property sheets.

13. A program module according to claim 1, wherein the information obtain by the initialization portion includes an event-request indicator which corresponds to one or more types of event notifications that a determined driving plug-in will accept from the initialization portion.

14. A user interface module of a printer driver for supporting to use of a printer by a computing device which executes an operating system, the user interface module being stored on a computer-readable medium, wherein device driver functionality of the printer driver is extendible by plural driver plug-ins which are storable on the computing device, each containing respective ones of plural extended functionalities of the printer driver, the user interface module comprising:

an initialization portion which is called byte operating system, whereupon the initialization portion detects plural driver plug-in identifiers corresponding to the plural driver plug-ins in a system registry of the operating system, determines plug-ins which are supported by the device driver in accordance with obtained information from each of the plural driver plug-ins, accesses and loads into a memory the plural driver plug-ins corresponding to the plural driver plug-in identifiers, obtains a pointer from the determined driver plug-in to an information function call within each of the plural determined driver plug-ins, executes the information function call to receive information from each of to determined driver plug-ins, stores the received information in a local data structure, and passes a portion of the received information to the operating system by using an operating system function call; and an operation portion that accesses anti executes a device driver functional portion of the driver plug-ins by using a functional pointer provided in the received information, that receives from the operating system an event notification corresponding to a print job being performed by the printer, and passes the event notification to one or more of the determined driver plug-ins in the case that a client-request indicator provided in the received information indicates tat the driver plug-in accepts the event notification.

15. A plurality of computer-executable driver plug-ins stored on a computer-readable medium, said plural driver plug-ins for use by a user interface program of a printer driver which supports the use of a printer by a computing device executing an operating system, each of the plural driver plug-ins for extending device driver functionality of the printer driver, and each of the plural driver plug-ins comprising:

a functional portion having executable code that supports at least one dialog property sheet corresponding to an extension of print driver functionality; and a resource portion which includes resource information that includes a number of dialog property sheets supported by the driver plug-in, a type of each dialog property sheet supported by the driver plug-in, attributes of each dialog property sheet supported by the driver plug-in, an information pointer to an information function call, and an event pointer to an event handler, whereby the information pointer is accessed by the user interface program to initiate the information function call which returns to the user interface program a resource pointer corresponding to the resource information of the resource portion, and a functional pointer corresponding to the executable code of the functional portion, and whereby the event pointer is used by the user interface program to initiate the event handler which passes the event notification received by the user interface program from the operating system to the driver plug-in, the event notification corresponding to a status of a print job being performed by the printer.

16. A computing device which executes an operating system and a device driver which drives an external device, comprising:
   a memory for storing plural driver plug-ins, each containing respective ones of plural extended device driver functionalities for the device driver;
   an initialization portion which is called by the operating system, whereupon the initialization portion detects the presence of the plural driver plug-ins, obtains information from each of the detected plural driver plug-ins, determines plug-ins which are supported by the device driver in accordance with the obtained information from each of the plural driver plug-ins, and passes the information from the determined driver plug-ins to the operating system; and
   an operation portion which accesses and executes the extended functionality of the determined plug-ins, receives from the operating system an event notification corresponding to the external device, and passes the event notification to one or more of the determined driver plug-ins in the case that the driver plug-in accepts the event notifications,
   wherein the initialization portion obtains the information from a determined driver plug-in by receiving a pointer to an information function call within the driver plus-in, and then by executing the information function call which returns the information to the initialization portion.

17. A method for a computing device which executes an operating system and a device driver for driving an external device, comprising the steps of:
   storing plural driver plug-ins, each containing respective ones of plural extended device driver functionalities for the device driver;
   executing an initialization portion which is called by the operating system, whereupon the initialization portion detects the presence of the plural driver plug-ins, obtains information from each of the detected plural driver plug-ins, determines plug-ins which are supported by the device driver in accordance with the obtained information from each of the plural driver plug-ins, and passes the information from the determined driver plug-ins to the operating system; and
   executing an operation portion which accesses and executes the extended functionality of the determined plug-ins, receives from the operating system an event notification corresponding to the external device, and passes the event notification to one or more of the determined driver plug-ins in the case that the driver plug-in accepts the event notification;
   wherein the initialization portion obtains the information from a determined driver plug-in by receiving a pointer to an information function call within the driver plug-in, and then by executing the information function call which returns the information to the initialization portion.

* * * * *

UNITED STATES PATENT AND TRADEMARK OFFICE
CERTIFICATE OF CORRECTION

PATENT NO. : 7,284,246 B2  
APPLICATION NO. : 10/131012  
DATED : October 16, 2007  
INVENTOR(S) : Devon James Kemp et al.

Page 1 of 1

It is certified that error appears in the above-identified patent and that said Letters Patent is hereby corrected as shown below:

COLUMN 3
    Line 12, "anther" should read --another--.

COLUMN 10
    Line 1, "A seen" should read --As seen--.

COLUMN 12
    Line 55, "is" should read --it--.

COLUMN 17
    Line 38, "of" should read --portion of--; and  
    Line 66, "obtain" should read --obtained--.

COLUMN 18
    Line 12, "byte" should read --by the--;  
    Line 24, "to" should read --the--;  
    Line 29, "anti" should read --and--; and  
    Line 37, "tat" should read --that--.

Signed and Sealed this

Twenty-fourth Day of June, 2008

JON W. DUDAS  
*Director of the United States Patent and Trademark Office*